United States Patent [19]

Stark

[11] Patent Number: 4,726,801

[45] Date of Patent: Feb. 23, 1988

[54] BELT OR CHAIN TENSION TENSIONER

[76] Inventor: Hans-Jürgen Stark, Dörrenberg 13, D-5630 Remscheid 12, Fed. Rep. of Germany

[21] Appl. No.: 892,720

[22] Filed: Jul. 31, 1986

[30] Foreign Application Priority Data

Aug. 2, 1985 [DE]  Fed. Rep. of Germany ....... 8522243

[51] Int. Cl.⁴ .............................................. F16H 7/08
[52] U.S. Cl. ..................................... 474/101; 474/138
[58] Field of Search ............... 474/101, 136, 138, 109, 474/111

[56] References Cited

U.S. PATENT DOCUMENTS 4,416,648  11/1983  Radocaj ........................... 474/138 X

FOREIGN PATENT DOCUMENTS 7809294  9/1978  Fed. Rep. of Germany .

Primary Examiner—Stephen J. Novosad
Assistant Examiner—Thuy M. Bui
Attorney, Agent, or Firm—Karl F. Ross; Herbert Dubno

[57] ABSTRACT

A belt or chain tension producing apparatus comprises a tension head engageable with a chain, belt or the like of a chain or belt drive and a tension piston on which the tension head is carried. The tension piston is guided longitudinally slidable in a guide body which is simultaneously a mounting element and is acted on by at least one tension spring engaged with it which is supported at its other end on the base of the guide body. In order to provide a particularly compact structure and thus also a more universal structure, at least a part of one side of the tension piston projects laterally from the guide body and the tension head is mounted laterally on a mounting surface on that projecting part. A recess may be provided in the tension head to better mount it on the tension piston.

20 Claims, 27 Drawing Figures

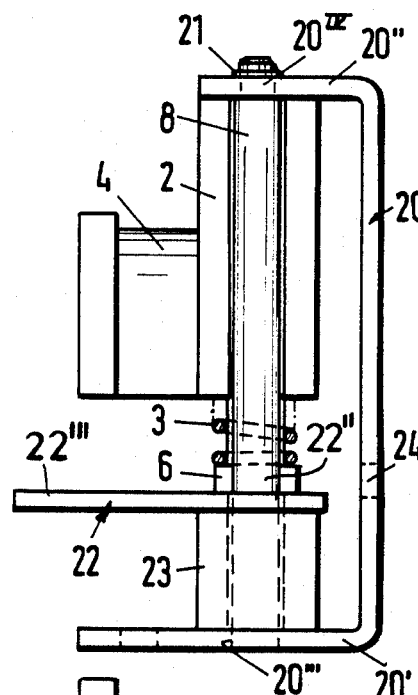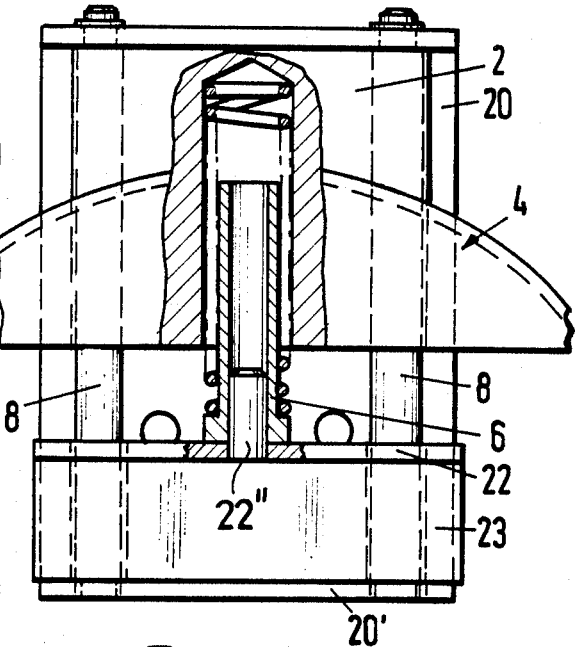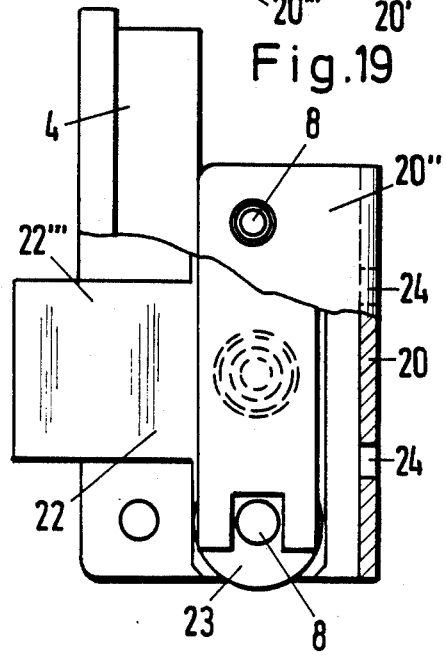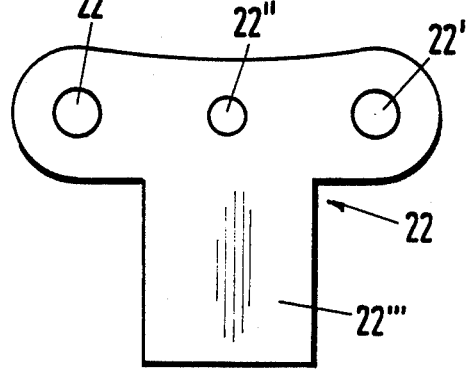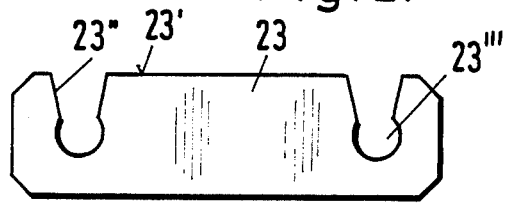

BELT OR CHAIN TENSION TENSIONER

FIELD OF THE INVENTION

My present invention relates to a belt or chain tensioner for the belt or chain of a chain or belt drive.

BACKGROUND OF THE INVENTION

A belt or chain tensioner includes a tension head engageable with a chain, belt or the like of a chain and belt drive and a tension piston on which the tension head is carried. The tension piston is longitudinally slidable in a guide body which is simultaneously a mounting element and is acted on by at least one tension spring engaged with it which is supported at its other end on the base of the guide body.

The belt and chain tension producing apparatus taught in German Utility Model No. 78 09 294 has for the most part a parallelepiped shaped tension piston which is slidable in a continuous smooth wall closed guide housing which is closed from below by a base plate and out of which the tension piston under the compressive force of the tension spring projects, carrying the tension head which presses against the chain or belt.

The belt or chain engaging member is provided with a curved sliding rail for use with a chain drive which can contact the chain of a chain drive while a tension head with a corresponding roller can be used for a belt drive. Since the spring or springs and the piston are coplanar with this rail or roller, this known belt or chain tension producing apparatus has a significant height or length which requires an appropriate space behind the chain or belt. For narrow space conditions and/or sharp turns of the chain and/or belt this known tension producing apparatus is not suitable.

OBJECTS OF THE INVENTION

It is the principal object of my invention to provide an improved belt or chain tension producing apparatus which obviates the drawbacks of the prior art.

It is another object of my invention to provide an improved belt or chain tension producing apparatus which is simpler and more compact than prior art tensioners and particularly which can fit into a narrower space.

It is also an object of my invention to provide an improved belt or chain tension producing apparatus which has greater versatility than the device described previously.

SUMMARY OF THE INVENTION

These objects and others which will become more apparent hereinafter are attained in a belt or chain tension producing apparatus comprising a tension head engaging and fitting on a chain, belt or the like and a tension piston on which the tension head is carried. The tension piston is guided so as to be longitudinally slidable in a guide body which is simultaneously a mounting element and is acted on by at least one tension spring engaged with it which is supported at its other end on the base of the guide body.

According to my invention at least a part of one side of the tension piston projects laterally from the guide body and the tension head is mounted laterally on that part of the tension piston so that the plane of the tension head is parallel to but laterally offset from the plane of the piston axis and the spring axis or axes.

In this way both the structural height and length are shortened so that the apparatus can be mounted in a narrower space. Advantageously the tension piston is substantially parallelepiped shaped and is provided with a projecting mounting surface oriented parallel to the direction of its travel on its side which projects from the guide body on which the tension head is detachably mounted. It is also possible to form the tension piston and tension head in a single piece.

In order to attain a solid mounting of the tension head on the tension piston, the tension head can be provided with a lateral recess into which the laterally projecting mounting surface of the piston head fits.

It is especially advantageous to provide a C-shaped cross section guide housing embracing the tension piston. The base of the guide body can project beyond the small sides of the guide housing and can be provided with attaching holes or some other attachment surface.

The guide body can also be provided with two opposing guide columns and having the tension piston lying between them. The guide body can have on its small sides corresponding guide grooves for these guide columns. The guide columns and guide grooves can have either a circular, semicircular, three cornered (trigonal) or multicornered (polygonal) cross section.

They can also be C-shaped in cross section and fit into an undercutting behind each of the small sides of the tension piston. Alternatively the side of the tension piston opposite its tension head can be provided with a dovetail guide groove in which a guide plate attached to the guide body projects. In this case a special guide housing can be omitted since the guide body comprises the base and both guide columns which necessarily also can be attached with each other by a deck plate, top piece or a combining piece at their ends facing away from the base.

It is particularly advantageous when the guide body is provided with a guide housing comprising a substantially C-shape flat bar between whose base and top piece the guide columns extend. That results in a very simple and economical structure for the belt or chain tension producing apparatus according to my invention.

Furthermore it is very advantageous when a support plate is guided slidably on the guide columns between the tension piston and the base of the guide housing on which is supported the tension spring with its end opposite to the tension piston. Advantageously one or more spacing pieces can be provided which slide on the guide columns between the guide housing top piece and the tension piston or the guide housing base and the support piece. Furthermore, the ends of the guide columns can be inserted in mounting holes present in the base and the top piece. The ends may be there with a Seeger ring or a E-clip lock ring.

The support plate can be provided with a finger like operating projection for ease of manipulation.

Additionally the support plate can project beyond the cross section of the tension head. Of course the spacing piece or pieces can be parallelepiped shaped and provided on their long sides with push-on slots to engage the guide columns. In this way the stroke length and also the force on the tension piston can be varied and thus the apparatus is adjusted to fit varying operating conditions.

For larger loads the invention provides two spaced apart parallel guide bodies provided with tension pistons projecting from their widest sides facing each other. A single tension head may be mounted between these two tension pistons. Since the tension pistons and/or guide bodies are positioned on both sides of the common tension head, one-sided loading of the tension head by a chain or belt is avoided so that my tension producing apparatus in this embodiment can produce a greater tension without substantial further effort.

This twin structure with a tension head lying between two tension pistons forms an extraordinarily solid and strong structure. It is enough when both tension pistons of both guide bodies are attached with each other simply by two threaded bolts which penetrate the tension head. The two guide bodies can however also have a common base.

In another embodiment of my invention the tension head comprises a head plate attached laterally to the tension piston, an axial shaft welded to the tension plate and a ball bearing for the tension roller on the axial shaft.

Screw attachment holes equispaced one above another on the tension piston can be used to mount the tension head at different heights.

BRIEF DESCRIPTION OF THE DRAWING

The above and other objects, features and advantages of my invention will become more readily apparent from the following description, reference being made to the accompanying highly diagrammatic drawing in which:

FIGS. 17, 18 and 19 are partially cutaway front elevational, side elevational and top plan views, respectively, of a third embodiment of a belt or chain tension producing apparatus according to my invention;

FIGS. 20 and 21 are top plan views of individual components in the aforementioned embodiments of the belt or chain tension producing apparatus according to my invention;

SPECIFIC DESCRIPTION

Figure 1:
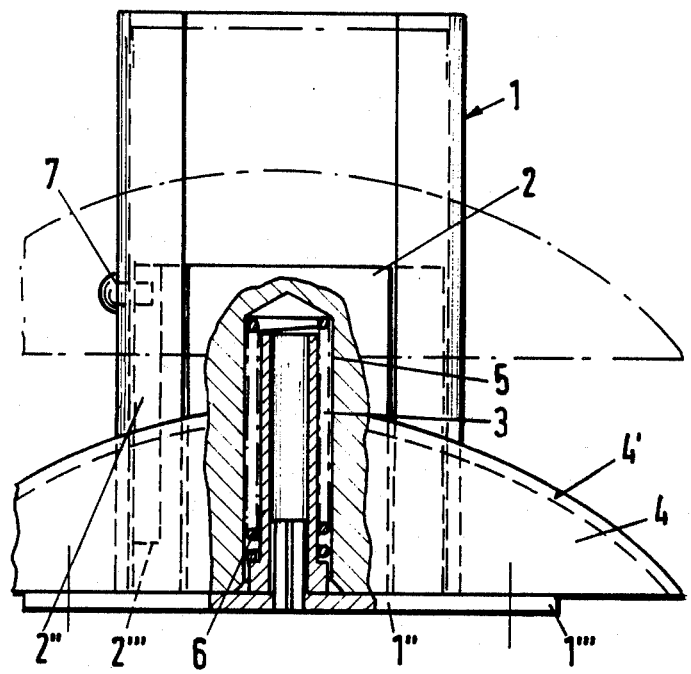
FIGS. 1, 2 and 3 are partially cutaway front elevational, top plan and side elevational views of a first embodiment of a belt or chain tension producing apparatus according to my invention.
Figure 3:
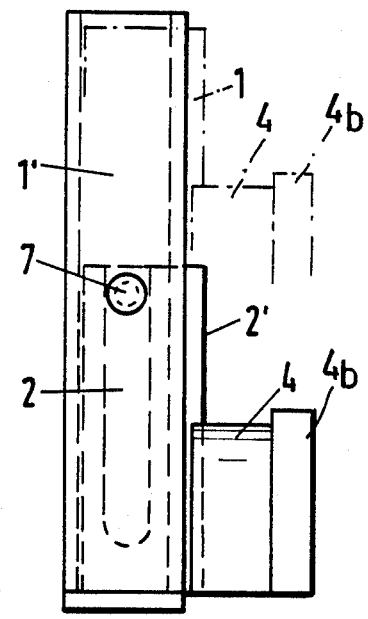
Figure 2:
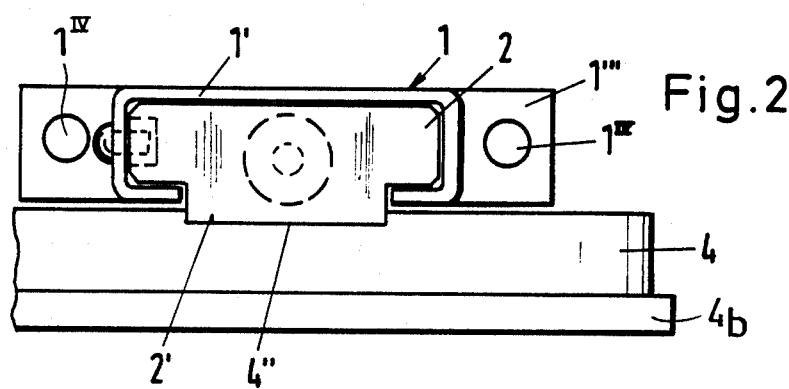

The chain tension producing apparatus shown in FIGS. 1 to 3 comprises a guide body 1, a tension piston 2 longitudinally slidable in it, a tension spring 3 acting on the tension piston 2 and a tension head 4 laterally attached to the tension piston 2 which is provided in the present case with a curved sliding rail 4' for a belt 4b. Instead of the sliding rail 4' the tension head 4 can be provided with a tension roller in order to make suitable tension in the belt 4b of a belt drive. The rail can also deflect a chain between sprockets in a chain drive.

The guide body 1 has a C-shaped cross section guide housing 1' which partially surrounds to a large extent the substantially parallelepiped tension piston 2. The guide housing 1' is rigidly attached with a base 1" of the guide body 1. Both ends 1'" of the base 1" project laterally beyond guide housing 1 and are provided with two attaching holes 1$^{IV}$. Thus the tension providing apparatus can be attached so as to be conveniently accessible rigidly to a machine frame or the like.

The tension piston 2 is provided with a centrally positioned blind hole 5 in which the compressible coil spring 3 is mounted about its spring bushing 6, which pushes the tension piston 2 and with it also the tension head 4 mounted laterally on it with the desired pressure against the chain 4b to be provided with tension. Instead of a single coil spring 3, of course, a plurality of such springs 3 can be used particularly in a tension producing apparatus of larger dimensions.

The substantially parallelepiped tension piston 2 on its side projecting from its guide body and/or guide housing 1' is provided with a projecting mounting surface 2' running parallel to its sliding direction on which the tension head 4 is detachably mounted. To make the seating in mounting better, the tension head 4 is provided with a lateral recess 4" in which the mounting surface 2' on the tension piston 2 fits. The corresponding mounting screws between tension piston 2 and tension head 4 have not been shown.

The limit of travel of the tension piston 2 in the guide housing 1' is defined by a contacting screw 7 in the guide housing 1'. This contacting screw 7 projects into a longitudinal groove 2" present on one side of the tension piston 2 with its inner end. The end 2'" of the longitudinal groove 2" acts as a limiting contacting surface on which the screw 7 bears at the limit of the motion of the tension piston 2.

In the embodiments of FIGS. 4 to 12 the guide body 1 is provided with two guide columns 8 positioned opposite each other and in corresponding guide grooves 9 between which the tension piston 2 lies. Both guide columns 8 are attached to the base 1" of the guide body 1. They can be attached also at their other ends by a cover plate or beam or rigidly with each other. Because of that they can simultaneously in a simple way provide a limit stop for the tension piston 2.

Figure 4:
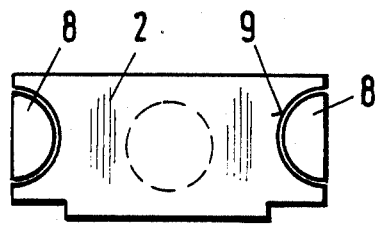
FIGS. 4 to 13 are schematic top plan views of different embodiments of a part of a belt or chain tension producing apparatus according to my invention showing different tension piston guide structures.
Figure 5:
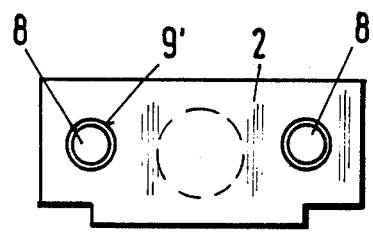
Figure 6:
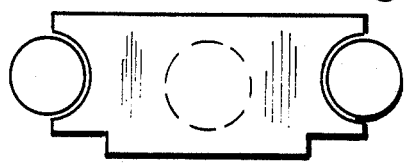
Figure 7:
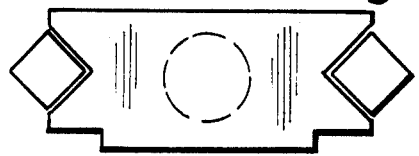
Figure 8:
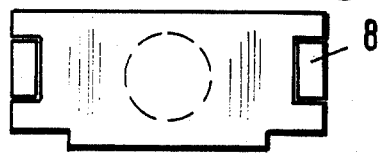
Figure 9:
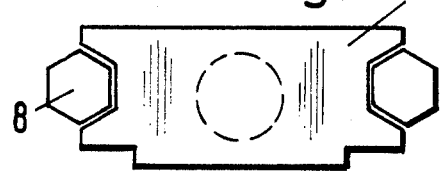
Figure 10:
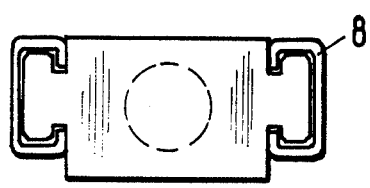
Figure 11:
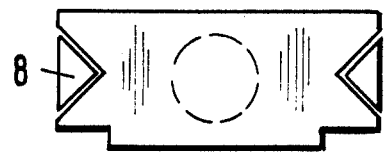

In case of FIG. 4 the guide columns 8 present in the tension piston 2 have a semicircular cross section while they are completely circular in cross section in the embodiment shown in FIGS. 5 and 6. In case of FIG. 5 the guide columns 8 are completely included in the tension piston 2 which has corresponding guide holes 9' instead of guide grooves.

In the case of FIGS. 7 to 12 the guide columns 8 and the corresponding grooves 9 are in the smaller sides of the tension piston 2 sometimes having a polygonal cross section. They can have a cross section, as the figures show, which is four cornered, rectangular, six sided, three cornered or also C-shaped. In case of FIG. 10 the guide grooves are formed in the tension piston 2 by suitably undercutting its smaller sides.

Figure 13:
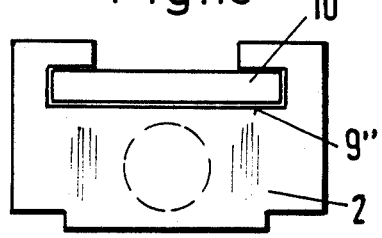
Figure 12:
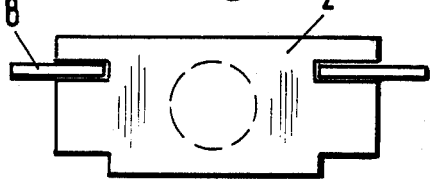

As FIG. 13 shows the tension piston 2 on its wide side opposite to the tension head 4 can be provided with a dovetail guide groove 9'' into which a suitably formed rectangular bar or guide plate 10 present on the guide body 1 projects.

Figure 14:
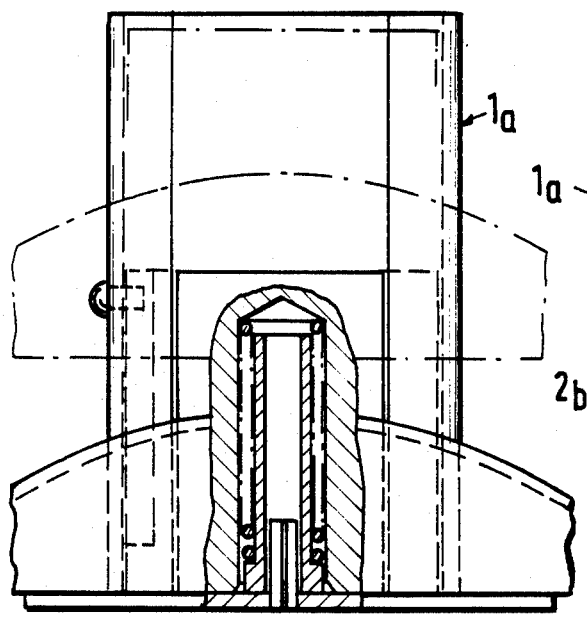
FIGS. 14 to 16 are partially cutaway front elevational, side elevational and top plan views, respectively, of another embodiment of a belt or chain tension producing apparatus according to my invention.
Figure 15:
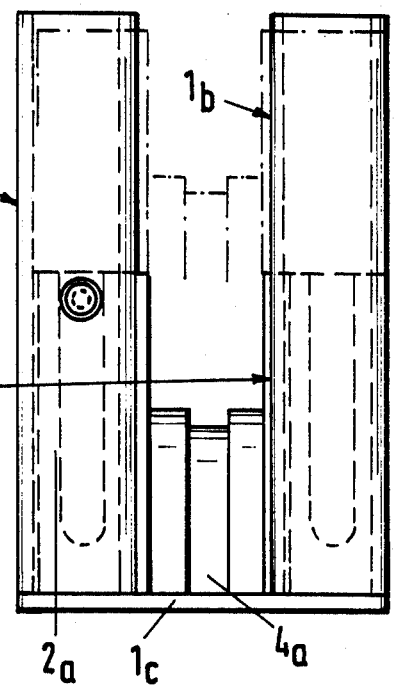
Figure 16:
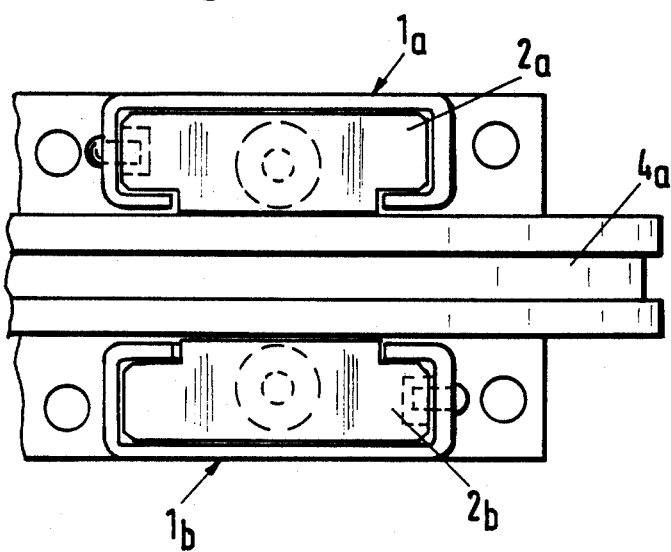

The embodiment according to FIGS. 14 to 16 is used in situations where there are heavier load conditions. Here the chain tension providing apparatus comprises two guide bodies $1_a$ and $1_b$ positioned with a suitable clearance from each other with tension pistons $2_a$ and $2_b$ projecting laterally toward each other from them and with the tension head $4_a$ mounted between them. In the simplest case this twin structure can be produced by attaching two guide bodies having a structure as shown in FIGS. 1 to 3 with each other by two threaded bolts which penetrate the tension pistons $2_a$ and $2_b$ and the tension head $4_a$ between them. It is also possible to have the guide bodies $1_a$ and $1_b$ lying on both sides of the tension head $4_a$ sitting on a common base $1_c$.

In the embodiment shown in FIGS. 17 to 19 a guide housing 20 comprises a flat bar bent into a substanially C-shape cross section as seen edgewise. Both guide columns 8 extend between the base 20' and the top piece 20'' of the flat bar. They are mounted with both of their ends in mounting holes 20''' and/or $20^{IV}$ present in the base 20' and in the top piece 20'' of the guide housing 20. They can be secured at their upper pin like ends by a Seeger or E-clip lock ring 21 to prevent axial sliding. Also in these embodiments the tension piston 2 is provided with a laterally mounted tension head 4. Likewise the tension piston 2 is braced by the upward force of the compressible coiled spring 3. It is supported however not on the base 20' of the guide housing 20, but with its spring bushing 6 on a supporting plate 22 which itself is supported by the spacing piece 23 on the base 20'. The supporting plate 22 is correspondingly provided with two holes 22' which are shown in the top view of FIG. 20 by which it is guided slidably on the guide columns 8. The mounting pin 22'' present on it serves for support of the spring sleeve or bushing 6. Finally the supporting plate 22 has a finger like operating projection 22''' with which it, as shown in FIG. 19, projects through the body of the tension head 4.

The spacing piece 23 is formed generally as a parallelepiped and, as shown in FIG. 21, is provided with push-on slots 23'' on its longitudinal side 23' and fits on the guide columns 8. The spacing piece 23 can be moved from its lower position between the base 20' of the guide housing 20 and the supporting plate 22 shown in FIGS. 17 and 18 conveniently also to an upper position between the top piece 20'' of the guide housing 20 and the upper side of the tension piston 2.

Moreover the supporting plate 22 standing under the force of the spring 3 need only be raised a bit with its finger like operating projection 22''' in order to move the spacing piece 23 from the guide columns 8. By this change of the spacing piece 23 at whose position several different spacing pieces of varying height can be mounted the range of motion of the tension piston 2 and/or its tension head 4 is varied without changing the force provided by the tension spring 3.

Likewise compression force of the tension spring 3 can be changed by removal either partially or completely of the spacing piece or pieces 23. That results in a good ability to fit the different structural requirements of the chain or belt tension providing apparatus. Naturally an easy height adjustment of the chain or belt tension providing apparatus can also be achieved alone by several different high lying screw attaching holes 24 in the rear of the guide housing 20.

Figure 22:
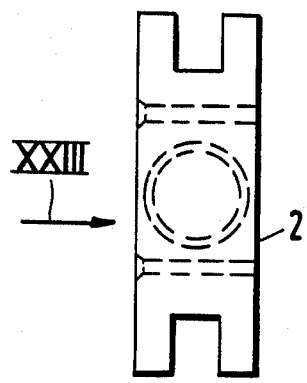
FIG. 22 is a top plan view of a tension piston from a belt or chain tension producing apparatus according to my invention.
Figure 23:
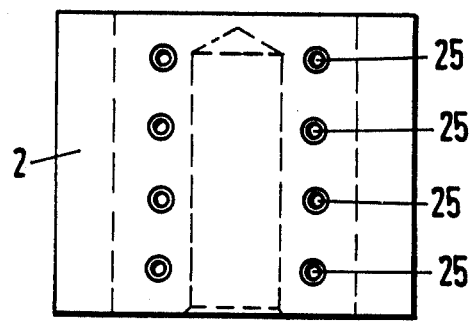
FIG. 23 is a side elevational view in the direction of the arrow XXIII of FIG. 22 of the tension piston of FIG. 22.

One further simple height adjustment for the tension head 4 can be provided in the form of several screw mounting holes 25 for the tension piston 2 spaced equally over each other in the tension providing piston 2 corresponding to FIGS. 22 and 23.

Figure 24:
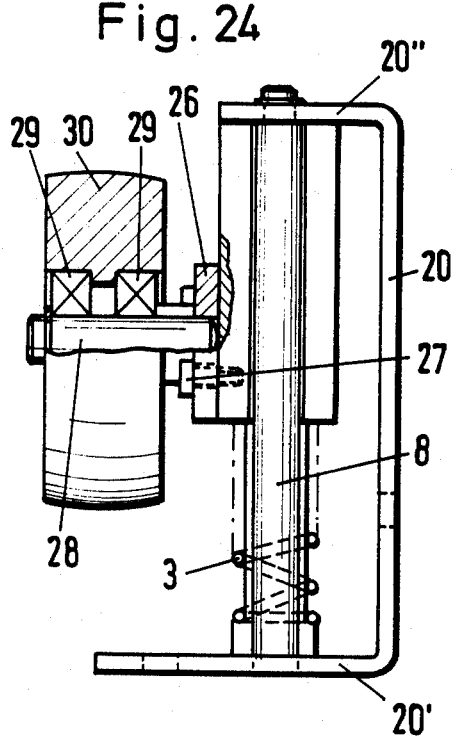
FIG. 24 is a side elevational view of a belt tension producing apparatus provided with a tension roller.
Figure 25:
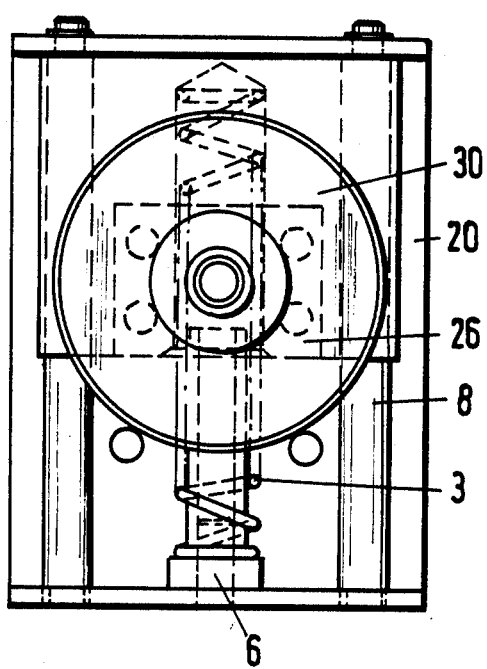
FIG. 25 is a front elevational view of the apparatus according to FIG. 24.

The belt tension providing apparatus shown in FIGS. 24 and 25 is provided like the chain tension providing apparatus according to FIGS. 17 to 19 with a substantially C-shape bent guide housing 20 between whose base 20' and top piece 20'' extends both guide columns 8 and the tension piston 2 under the compression force of the tension spring 3.

The head plate 26 is attached laterally by screws 27 on the tension piston 2. The head plate 26 supports the axial shaft 28 which is welded in a corresponding hole in the head plate 26.

The tension roller 30 over which the belt to be provided with tension runs is mounted rotatably on the axial shaft 28 on the ball bearing 29. Also in this case the compression force of the tension spring 3 or also the maximum distance of the tension roller 30 can be changed using the supporting plate 22 or one or more of the spacing pieces 23. It is possible in both this belt tension providing apparatus and in the chain tensioner according to FIGS. 17 to 19 to provide a twin arrangement like in the case of FIGS. 14 to 16 without substantial further effort. Moreover the guide housing need only be suitably lengthened and provided with additional columns for the second tension piston.

Figure 26:
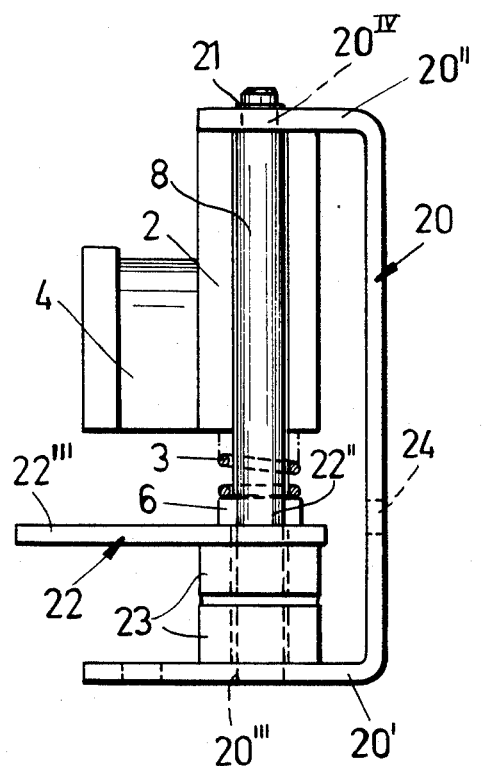
FIGS. 26 and 27 are side and front elevational views of another embodiment of the belt or chain tension producing apparatus according to my invention.
Figure 27:
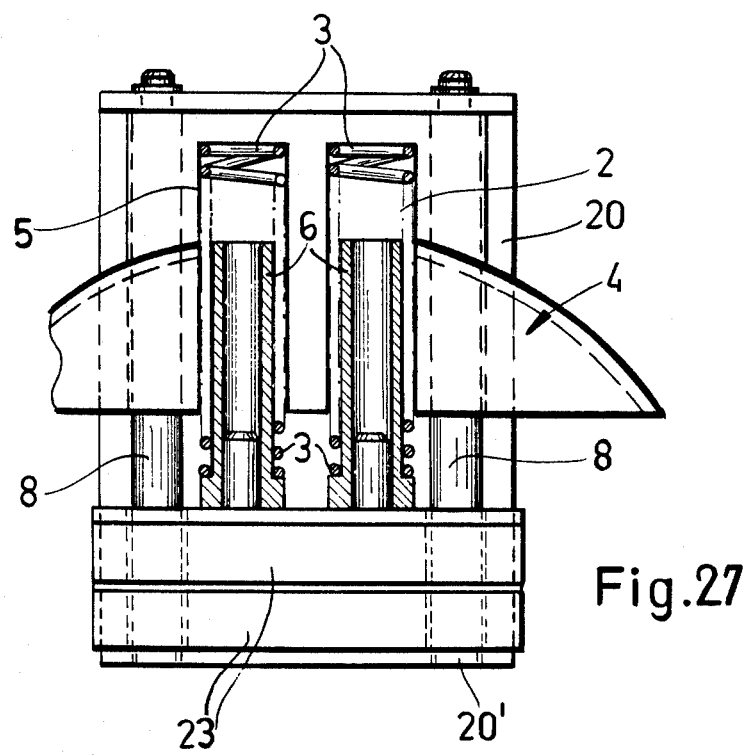

FIGS. 26 and 27 show an alternative embodiment of my invention having two tension springs 3 and two spacing pieces 23. It is otherwise identical to the embodiment of FIGS. 17 to 19 and operates as described above.

I claim:

1. In a belt or chain tensioner comprising a tension head engagable with a stretch of endless member to be tensioned and a tension piston on which said tension head is carried, said tension piston being guided longitudinally slidable in a guide body which is simultaneously a mounting element and said tension piston being acted on by at least one tension spring engaged therewith which is supported on the base of said guide body, the improvement wherein at least a part of one side of said tension piston projects laterally from said guide body and said tension head is mounted laterally on said part of said side of said tension piston so that said head being in a plane parallel to but spaced from a plane of said piston of said spring, and said guide body is provided with two opposing guide columns and small sides of said tension piston positioned between said guide columns two correspondingly shaped guide grooves are provided, and wherein said guide body is provided with a guide housing engaging said tension piston, said housing being a substantially C-shaped bent flat bar having said base and a top piece between which said guide columns extend.

2. The improvement defined in claim 1 wherein said tension piston has a substantially parallelepiped shape and is provided with a projecting mounting surface oriented parallel to the travel direction of said tension piston on said part of said side of said tension piston which projects from said guide body on which said tension head is detachably mounted.

3. The improvement defined in claim 2 wherein said tension head is provided with a lateral recess in which said projecting mounting surface on said tension piston fits.

4. The improvement defined in claim 2 wherein said guide body is provided with a substantially C-shape cross section guide housing engaging said tension piston.

5. The improvement defined in claim 4 wherein said base of said guide body projects beyond small sides of said guide housing and is provided with two attaching holes.

6. A belt or chain tension producing apparatus comprising:
   a tension head engagable with a chain, belt or the like;
   a substantially parallelepiped shaped tension piston on which said tension head is carried;
   a guide body in which said tension piston is guided longitudinally slidable which is simultaneously a mounting element;
   at least one tension spring acting on said tension piston supported on the base of said guide body;
   a projecting mounting surface oriented parallel to the travel direction of said tension piston on a part of a slide of said tension piston which projects laterally from said guide body on which said tension head is detachably mounted;
   a lateral recess in said tension head in which said projecting mounting surface present on said piston fits; and
   two opposing guide columns provided in said guide body and on the small sides of said tension piston position between said columns two correspondingly shaped guide grooves are provided for each of said guide columns.

7. The improvement defined in claim 1 wherein each of said guide columns and said guide grooves has a circular or semicircular cross section.

8. The improvement defined in claim 1 wherein each of said guide columns and said guide grooves has polygonal cross section.

9. The improvement defined in claim 1 wherein said guide columns each have a C-shape cross section and said small sides of said tension piston are correspondingly undercut.

10. The improvement defined in claim 2 wherein said tension piston has a dovetail guide groove on the wide side of said tension piston opposite said part of said side on which said tension head is mounted and a guide plate from said guide body projects into said dovetail guide groove.

11. The improvement defined in claim 1 wherein two of said guide bodies positioned side by side spaced from each other are provided with two of said tension pistons projecting from the wide sides of said guide bodies facing each other, said tension pistons facing each other and having a single one of said tension heads mounted between them.

12. The improvement defined in claim 11 wherein said guide bodies lying on opposite sides of said tension pistons have a common base.

13. The belt or chain tension producing apparatus defined in claim 6 wherein said base of said guide body extends beyond the small sides of said guide housing and has two attaching holes.

14. The improvement defined in claim 1 wherein pin shaped ends of said guide columns are inserted into corresponding mounting holes formed in said top piece and said base of said guide housing and are secured against axial sliding by engaging a clip ring on said pin shaped ends.

15. The improvement defined in claim 14 wherein between said tension piston and said guide housing a support plate slidable on said guide columns is provided, on which said tension spring is supported and further at least one spacing piece is provided which can be slid in between said top piece of said guide housing and said tension piston or said base of said guide housing and said support plate.

16. The improvement defined in claim 15 wherein said support plate has a finger like operating projection.

17. The improvement defined in claim 16 wherein said support plate projects beyond the cross section of said tension head.

18. The improvement defined in claim 15 wherein said spacing piece is substantially parallelepipedal and on a long side of said spacing piece two push on slots are provided to fit said guide columns.

19. The improvement defined in claim 1 wherein a plurality of screw attachment holes lying over each other spaced equally from each other are provided in said tension piston for a plurality of different attachment heights for said tension head.

20. The improvement defined in claim 1 wherein said tension head comprises a head plate laterally attached to said tension piston, an axial shaft attached to said head plate and a ball bearing provided for said axial shaft.

* * * * *